(12) United States Patent
Yoo et al.

(10) Patent No.: US 12,436,171 B2
(45) Date of Patent: Oct. 7, 2025

(54) PROBE CARD PMIC AND SIGNAL SWITCH IC SUPPORTING EFFICIENT CHANNEL CONTROL

(71) Applicant: TECHWIDU CO., LTD., Suwon-si (KR)

(72) Inventors: Hyoung-Suk Yoo, Seoul (KR); Deok-Ju Mun, Hwaseong-si (KR)

(73) Assignee: TECHWIDU CO., LTD., Suwon-si (KR)

( * ) Notice: Subject to any disclaimer, the term of this patent is extended or adjusted under 35 U.S.C. 154(b) by 51 days.

(21) Appl. No.: 18/683,273

(22) PCT Filed: Jul. 8, 2022

(86) PCT No.: PCT/KR2022/009991
§ 371 (c)(1),
(2) Date: Feb. 13, 2024

(87) PCT Pub. No.: WO2023/043021
PCT Pub. Date: Mar. 23, 2023

(65) Prior Publication Data
US 2025/0138051 A1    May 1, 2025

(30) Foreign Application Priority Data
Sep. 14, 2021    (KR) .................. 10-2021-0122260

(51) Int. Cl.
*G01R 1/067* (2006.01)
*G01R 1/02* (2006.01)
*G01R 1/04* (2006.01)
*G01R 1/073* (2006.01)
*G01R 31/28* (2006.01)

(52) U.S. Cl.
CPC ..... *G01R 1/06766* (2013.01); *G01R 1/07342* (2013.01); *G01R 31/2886* (2013.01)

(58) Field of Classification Search
CPC . G01R 1/02; G01R 1/04; G01R 1/067; G01R 1/073; G01R 31/28
See application file for complete search history.

(56) References Cited

U.S. PATENT DOCUMENTS

2024/0345159 A1*  10/2024  Kim ................. G01R 31/317

FOREIGN PATENT DOCUMENTS

| KR | 100739883 B1  | 7/2007  |
| KR | 20070100835 A | 10/2007 |
| KR | 20200016680 A | 2/2020  |
| KR | 102133485 B1  | 7/2020  |
| KR | 102293671 B1  | 8/2021  |

* cited by examiner

*Primary Examiner* — Neel D Shah
(74) *Attorney, Agent, or Firm* — NKL Law; Jae Youn Kim (57) ABSTRACT

A switch IC includes a plurality of cores, each of the cores including a plurality of channels, each of the channels being connected to a device under test (DUT), a command decoder configured to receive an identifier (ID) and a command, decode the ID and the command, and form a control signal for control of the cores and the channels, and a selector configured to provide a signal for control of activation of the cores and the channels to correspond to the control signal output by the command decoder, wherein the command includes switch IC selection data, OP CODE, core selection data, and channel selection data in one frame, and is a command encoded to hierarchically control the plurality of cores and the plurality of channels.

8 Claims, 6 Drawing Sheets

PROBE CARD PMIC AND SIGNAL SWITCH IC SUPPORTING EFFICIENT CHANNEL CONTROL

TECHNICAL FIELD

The present invention relates to a probe card PMIC and a signal switch IC, and more particularly to a probe card PMIC and a signal switch IC supporting efficient channel control.

DESCRIPTION OF THE RELATED ART

Fine patterns are formed on a semiconductor wafer and diced to form a semiconductor die, which is packaged to form a final product. As semiconductor devices formed on wafers become smaller, denser, and more highly integrated, defect determination for determining whether the semiconductor devices perform intended functions thereof in a wafer state has emerged as an important issue.

A probe card is a device that connects a semiconductor chip and test equipment to inspect an operation of a semiconductor device formed on a wafer. A probe pin electrically connected to the semiconductor device formed on the wafer is formed on the probe card. The probe pin is electrically connected to the semiconductor device to provide an electrical signal and detect a signal provided by the semiconductor device.

A plurality of multi-channel PMICs and multi-channel signal switch ICs (hereinafter collectively referred to as switch ICs) are mounted on the probe card to solve the insufficient number of measurement channels of equipment through multiplexing. During actual testing, to test a certain device under test (DUT), only a channel connected to the relevant DUT is set to be conductive or supply a voltage, and the other channels are set to be blocked, so that measurements are performed only on relevant DUTs. Even as semiconductor miniaturization progresses and a greater number of measurement channels is needed per wafer, test costs are reduced by developing a new probe card rather than purchasing equipment.

DETAILED DESCRIPTION OF THE INVENTION

Technical Problem

Even though multiplexing through a probe card has been applied to reduce test costs, current extreme miniaturization of semiconductor processes requires significantly high multiplexing on the probe card. This ultimately means that a significantly large number of switch ICs needs to be mounted on one probe card, and the time required to control each of multiplexed channels has gradually been increasing. Therefore, now, a channel setup time has become a main factor that determines throughput of a semiconductor chip.

Therefore, to achieve higher throughput, switch ICs controlled by a signaling method that may set a state of each channel in a short time are needed.

Solution to the Technical Problem

In accordance with the present invention, the above and other objects can be accomplished by the provision of a switch IC including a plurality of cores, each of the cores including a plurality of channels, each of the channels being connected to a device under test (DUT), a command decoder configured to receive an identifier (ID) and a command, decode the ID and the command, and form a control signal for control of the cores and the channels, and a selector configured to provide a signal for control of activation of the cores and the channels to correspond to the control signal output by the command decoder, wherein the command includes switch IC selection data, OP CODE, core selection data, and channel selection data in one frame, and a command encoded to hierarchically control the plurality of cores and the plurality of channels is supported.

According to an aspect of the present invention, the switch IC may be a signal switch IC connected to a signal processing DUT, or the switch IC may be one of PMICs connected to a power DUT.

According to an aspect of the present invention, the switch IC selection data, the OP CODE, the core selection data, and the channel selection data may be transmitted through a data bus through which a plurality of bits is transmitted in parallel.

According to an aspect of the present invention, the switch IC selection data may be data of at least one bit, and the data of the at least one bit of the switch IC selection data may correspond to the switch IC, activation of which is controlled.

According to an aspect of the present invention, the core selection data may be data of at least one bit, and the data of the at least one bit of the core selection data may correspond to the core, activation of which is controlled.

According to an aspect of the present invention, the channel selection data may be data of at least one bit, and the data of the at least one bit of the channel selection data may correspond to the channel, activation of which is controlled.

According to an aspect of the present invention, a channel selected by the channel selection data may be selected equally for all cores selected by the core selection data, and a core selected by the core selection data may be selected equally for all switch ICs selected by the switch IC selection data.

According to an aspect of the present invention, the switch IC selection data, the OP CODE, the core selection data, and the channel selection data may be in succession to form the one frame.

Advantageous Effect of the Invention

According to the present invention, a time spent on inspecting defects in a semiconductor wafer may be shortened. Therefore, an advantage of improving semiconductor productivity is provided.

The effects of the present invention are not limited to those mentioned above, and other problems not mentioned herein will be clearly understood by those skilled in the art from the above description.

BEST MODE IMPLEMENTING THE INVENTION

A probe card PMIC and a signal switch IC supporting efficient channel control according to an embodiment of the present invention each include a plurality of cores, each of the cores including a plurality of channels, each of the channels being connected to a DUT, a command decoder configured to receive an identifier (ID) and a command, decode the ID and the command, and form a control signal for control of the cores and the channels, and a selector configured to provide a signal for control of activation of the cores and the channels to correspond to the control signal output by the command decoder, wherein the command includes switch IC selection data, OP CODE, core selection data, and channel selection data in one frame, and a command encoded to hierarchically control the plurality of cores and the plurality of channels is supported.

EMBODIMENT OF THE INVENTION FOR IMPLEMENTATION

Hereinafter, preferred embodiments of the present invention will be described in detail with reference to the attached drawings. Prior thereto, terms or words used in this specification and claims should not be construed as limited to usual or dictionary meanings, and should be interpreted as having meanings and concepts consistent with the technical idea of the present invention based on the principle that an inventor may appropriately define a concept of a term to describe the invention of the inventor in the best way possible. Therefore, the embodiments described in this specification and the configurations illustrated in the drawings are only one of the most preferred embodiments of the present invention and do not represent the entire technical idea of the present invention. Thus, it should be understood that, at the time of filing this application, there may be various equivalents and modifications that can replace the embodiments and configurations.

The terms used herein are used to describe specific embodiments and thus are not intended to limit the invention. As used herein, the singular forms include the plural forms unless the context clearly indicates otherwise.

Hereinafter, a probe card (10) of the present invention will be described with reference to the attached drawings. For brief and clear description, the following illustrates an active-high signaling method activated in a logic-high state. However, this is for illustration, and it is obvious that an active-low signaling method activated in a logic-low state may be used for operation unlike the illustrated examples.

Figure 1:
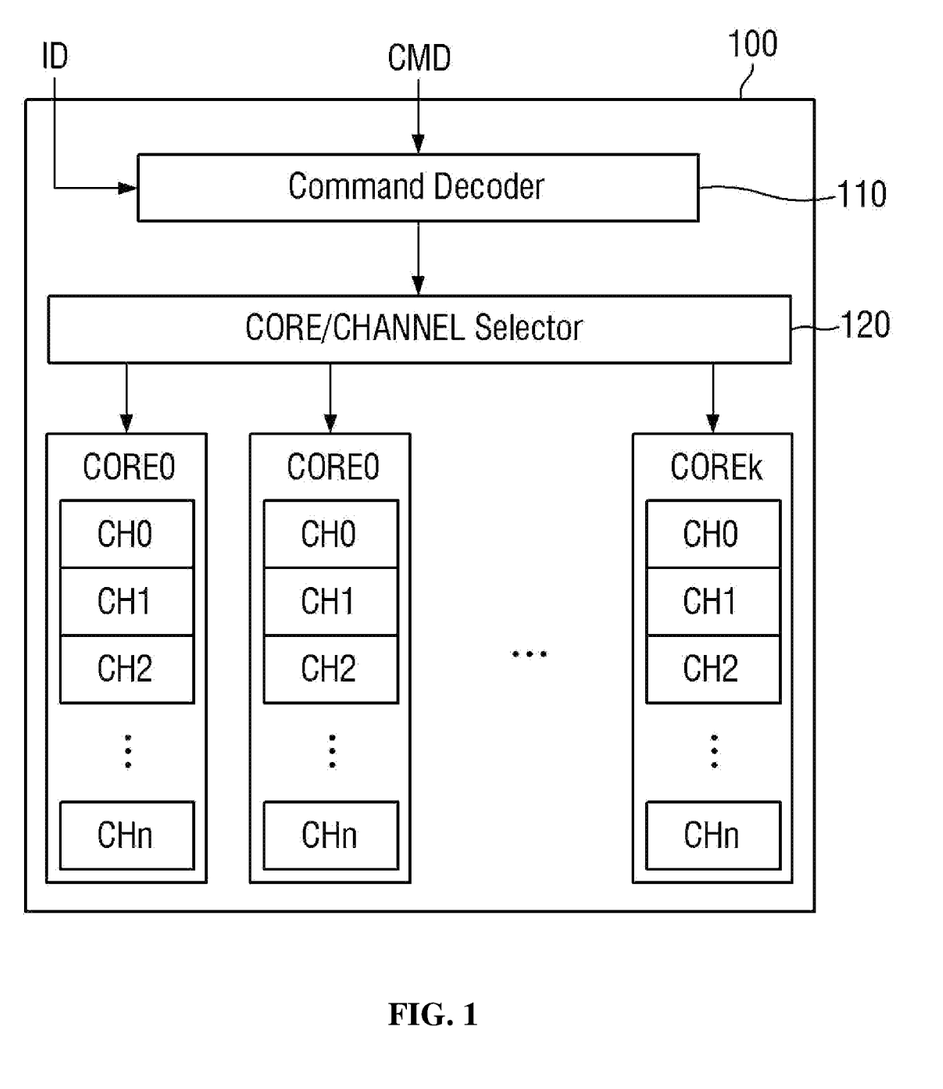
FIG. 1 is a block diagram illustrating an outline of a switch IC (100) of the present invention.

FIG. 1 is a block diagram illustrating an outline of a switch IC (100) of the present invention. Referring to FIG. 1, the switch IC (100) includes a plurality of cores (CORE0, CORE1, . . . , COREk), in which each of the cores includes a plurality of channels (CH0, CH1, . . . , CHn), and each of the channels is connected to a DUT, a command decoder (110) configured to receive an identifier (ID) and a command (CMD), decode the ID and the command, and form a control signal for control of the cores (CORE0, CORE1, . . . , COREk) and the channels (CH0, CH1, . . . , CHn), and a selector (120) configured to provide a signal for control of activation of the cores and the channels to correspond to the control signal output by the command decoder (110), and the command includes switch IC selection data, core selection data, and channel selection data in one frame, and is encoded to hierarchically designate and control the plurality of cores and the plurality of channels.

Figure 2:
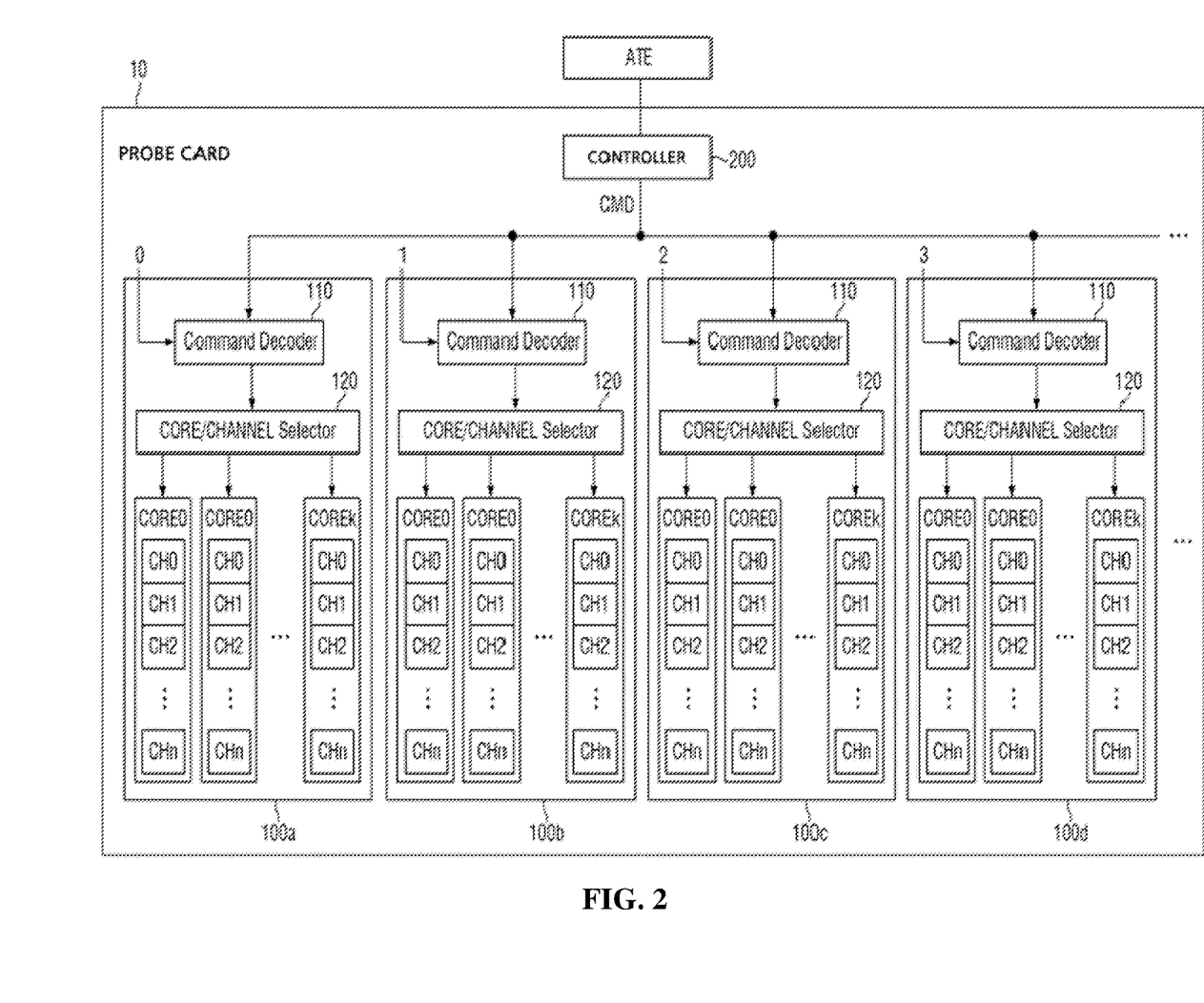
FIG. 2 is a block diagram illustrating an outline of a probe card (10) including a plurality of switch ICs (100a, 100b, 100c, 100d) and a controller (200), and automatic test equipment (ATE)

FIG. 2 is a block diagram illustrating an outline of the probe card (10) including a plurality of switch (ICs 100a, 100b, 100c, and 100d) and a controller (200), and ATE. Referring to FIGS. 1 and 2, the probe card (10) includes the controller (200) and a plurality of switch ICs (100) controlled by being provided with a command (CMD) provided by the controller (200).

The ATE is a device is a device electrically connected to the DUT (not illustrated), receives a signal from the DUT, and determines whether the DUT is defective based on a test vector of a user. The ATE has a unique signal protocol.

The ATE transmits a command to the controller using the unique signal protocol of the ATE to determine which of DUTs is to be tested. The controller (200) receives and interprets a signal of the ATE, selects which channels of which switch ICs need to be controlled to test the corresponding DUTs, and transmits a signal that controls the plurality of selected switch ICs (100a, 100b, 100c, and 100d, . . . ). As an example, the controller (200) may be implemented as a Field Programmable Gate Array (FPGA).

Measurement channels (not illustrated) of the ATE are connected to respective channel inputs of the switch ICs (100a, 100b, 100c, 100d, . . . ) of the probe card (10), and these signals are multiplexed in the switch IC and connected to a plurality of DUTs through a plurality of probe pins. In one embodiment, the switch ICs (100a, 100b, 100c, 100d, . . . ) may each be implemented as an analog multiplexer having a unique identifier (ID). When DUT testing is conducted, the probe card (10) turns on a channel connected to the DUT to be tested and blocks the remaining channels to test the DUT.

As described above, each of the switch ICs (100a, 100b, 100c, 100d, . . . ) includes a plurality of cores (CORE0, CORE1, . . . , COREk), and each core includes a plurality of channels each connected to the DUT. In addition, each of the cores (CORE0, CORE1, . . . , COREk) includes n channels (CH0, CH1, . . . , CHn).

Each switch IC may preferably include $2^k$ cores (k being a natural number). Each core includes a plurality of channels, and may preferably include $2^n$ channels (n being a natural number).

Figure 3:
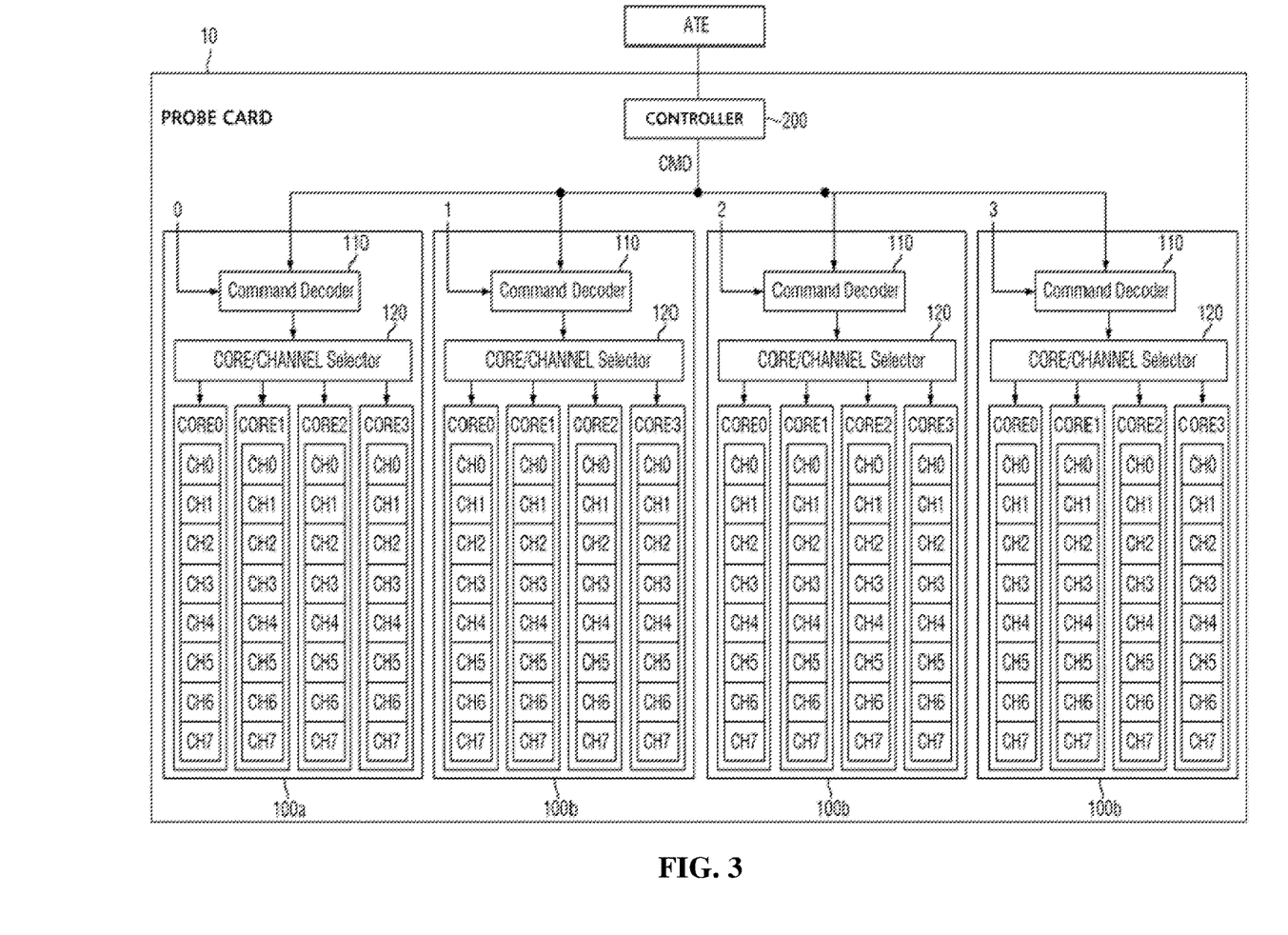
FIG. 3 is a diagram for describing operations of the plurality of switch ICs.

FIG. 3 is an illustrative diagram for describing operations of the plurality of switch ICs. The probe card (10) may include a plurality of switch ICs. However, hereinafter, for concise and clear description, a description will be given using an example in which the probe card (10) includes four switch ICs (100a, 100b, 100c, and 100d), each of the switch ICs (100) includes four cores (CORE0, CORE1, CORE2, and CORE3), and each core includes eight channels (CH0, CH1, . . . , CH7) as illustrated in FIG. 3.

However, this is only an example for easy and concise description and is not intended to limit the scope of the present invention. Accordingly, each switch IC may include five or more cores or three or fewer cores, and each core may include nine or more channels or seven or fewer channels.

Figure 4:
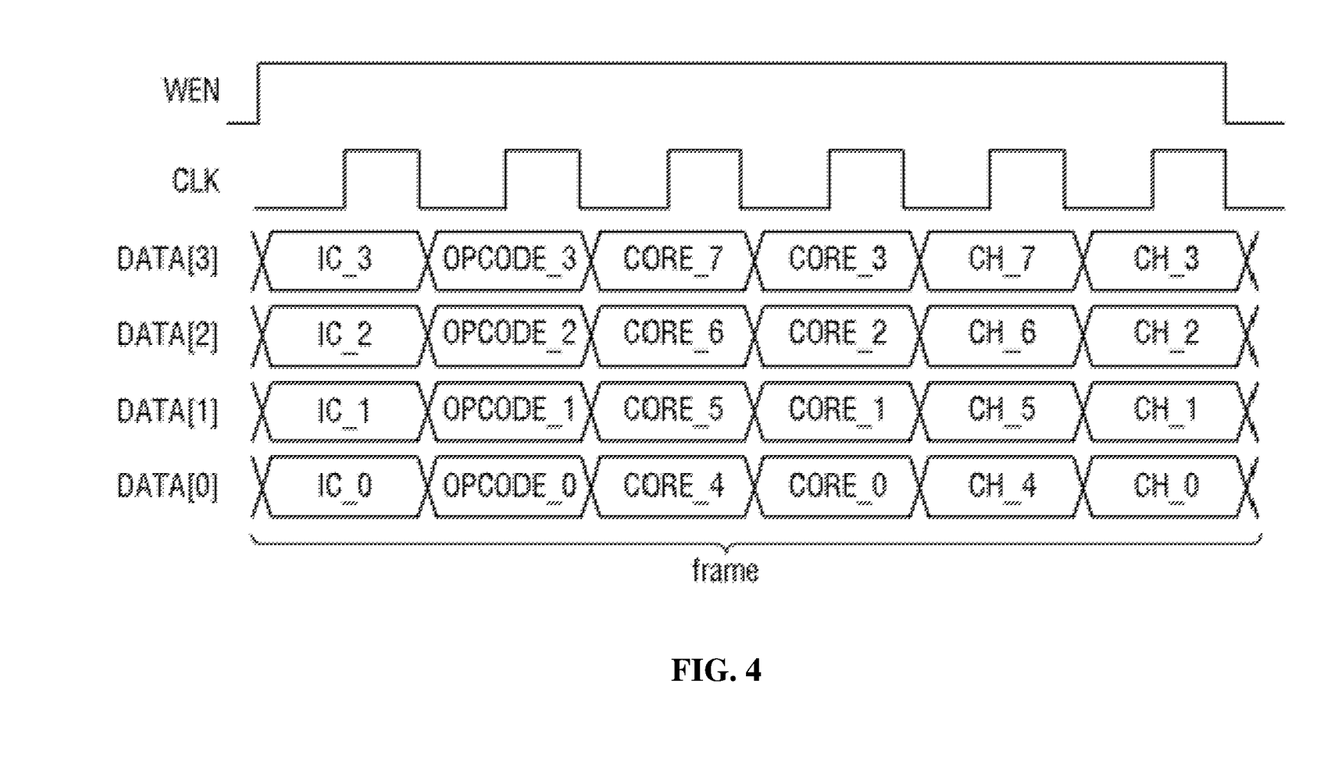
FIG. 4 is a diagram illustrating one frame of a transmitted signal.

Hereinafter, operations of the switch ICs (100a, 100b, 100c, and 100d) will be examined. FIG. 4 is a timing diagram illustrating an outline of a command (CMD) provided by the controller (200) to each of the switch ICs (100a, 100b, 100c, and 100d).

Referring to FIGS. 3 and 4, the command (CMD) provided by the controller 200 includes an enable signal (WEN) and a plurality of data bits (DATA [0:3]). The plurality of data bits (DATA [0:3]) may be transmitted through a parallel data bus. In addition, the controller (200) may further transmit a clock signal (CLK), and each of the plurality of data bits, the enable signal, and the clock signal are transmitted in parallel. In one embodiment, the controller (200) may further provide the clock signal (CLK), and the plurality of data bits (DATA [0:3]) may be synchronized with the clock signal (CLK) provided by the controller (200) and provided.

The switch ICs (100a, 100b, 100c, and 100d) are not activated by the enable signal WEN in a logic-low state. However, when the enable signal (WEN) is logic high, the switch ICs (100a, 100b, 100c, and 100d) perform operations according to an activation command. However, this is an example of implementation, and as described above, it is obvious that the switch ICs may be activated by the enable signal (WEN) in the logic-low state and deactivated when the enable signal (WEN) is logic high.

The plurality of data bits (DATA [0:3]) includes switch IC selection data, OP CODE, core selection data, and channel selection data in one frame. In the embodiment illustrated in FIG. 3, IC_0, IC_1, IC_2, and IC_3, which are data initially transmitted through data bits [0:3], are switch IC selection data that controls activation of the switch ICs 100a, 100b, 100c, and 100d, respectively.

The OP CODE transmitted subsequently designates a specific operation to be performed by a switch IC. As an example, OP CODE designates the operation to be performed by the switch IC. The operation to be performed serves to receive designation from the user as to which operation is to be performed among functions supported by the switch IC, such as channel activation and deactivation, and voltage supply.

CORE_0, CORE_1, CORE_2, and CORE_3 transmitted subsequently are core selection data that controls activation of the cores (CORE_0, CORE_1, CORE_2, and CORE_3) in the switch IC, respectively. Subsequently, channel selection data included in each core may be transmitted.

In the example illustrated in FIG. 4, data bit [1] (DATA [1]) includes switch IC selection data that activates a first switch IC (IC_1) within one frame, core selection data that activates a first core (CORE_1) in the switch IC, channel selection data (CH_5) that activates a fifth channel, and channel selection data (CH_1) that activates a first channel.

As illustrated in FIG. 4, data bits transmitted through a data bus have switch IC selection data, core selection data, and channel selection data in succession to form one signal frame.

Figure 5:
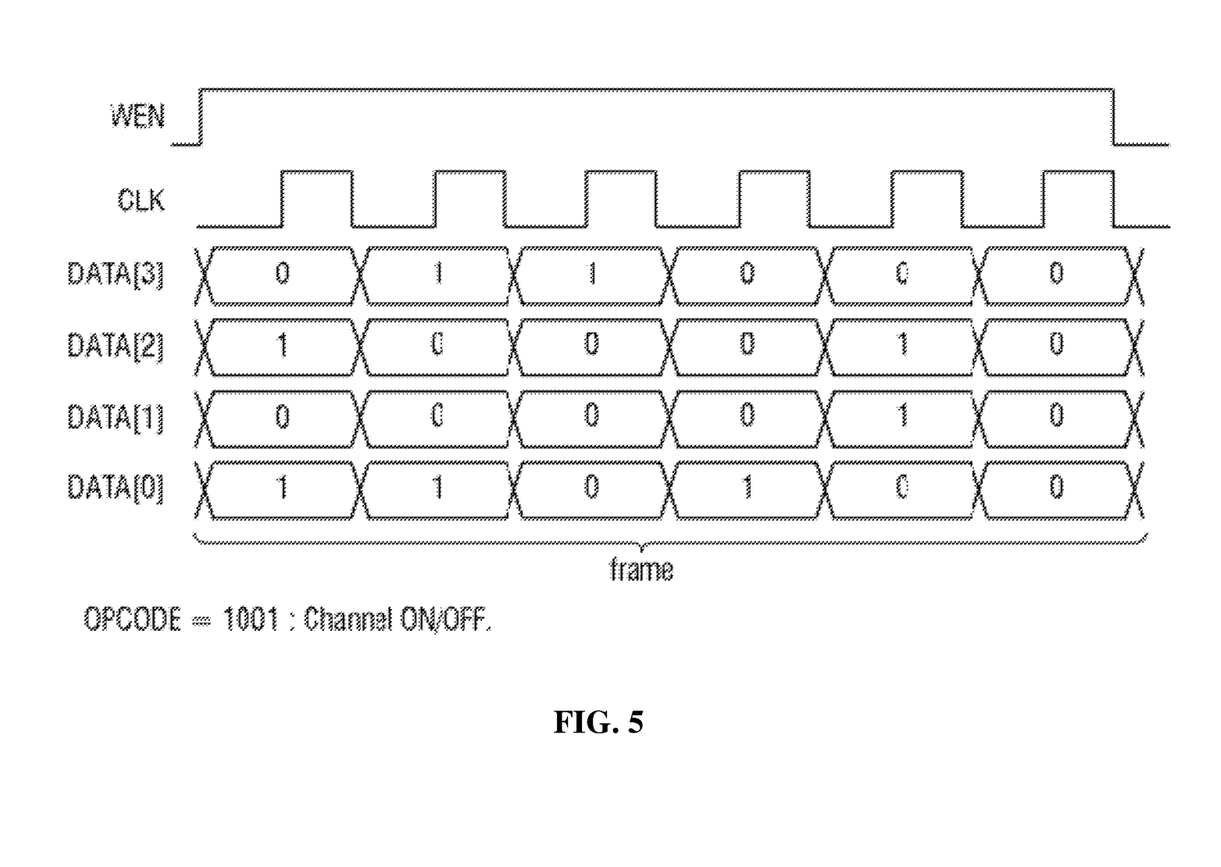
FIG. 5 is a timing diagram schematically illustrating a command (COM) output by an activation controller (200) according to an embodiment.

FIG. 5 is a timing diagram schematically illustrating a command (COM) output by the activation controller (200) according to an embodiment. Referring to FIGS. 1 to 3, a first bit of the command (COM) transmitted through the data bus (DATA [0:3]) is an activation bit of a switch IC allocated to each data bit in the data bus. In the embodiment illustrated in FIG. 3, data bits DATA [0] and DATA [2] are in a logic-high state, and thus the switch ICs 100a and 100c corresponding thereto are activated.

Next, OP CODE is transmitted through the data bus (DATA [0:3]). In the embodiment illustrated in FIG. 5, a binary number 1001 is transmitted, and this value designates an operation to activate/deactivate the channel.

Subsequently, core selection data is transmitted through the data bus DATA [0:3]. In the embodiment illustrated in FIG. 5, data bits DATA [0] and DATA [3] are in a logic-high state, and thus cores CORE_0 and CORE_3 corresponding thereto are activated.

Subsequently, channel selection data is transmitted through the data bus (DATA [0:3]). In the embodiment illustrated in FIG. 4, data bits DATA [1] and DATA [2] are in a logic-high state, and thus channels CH_5 and CH_6 corresponding thereto are activated.

Figure 6:
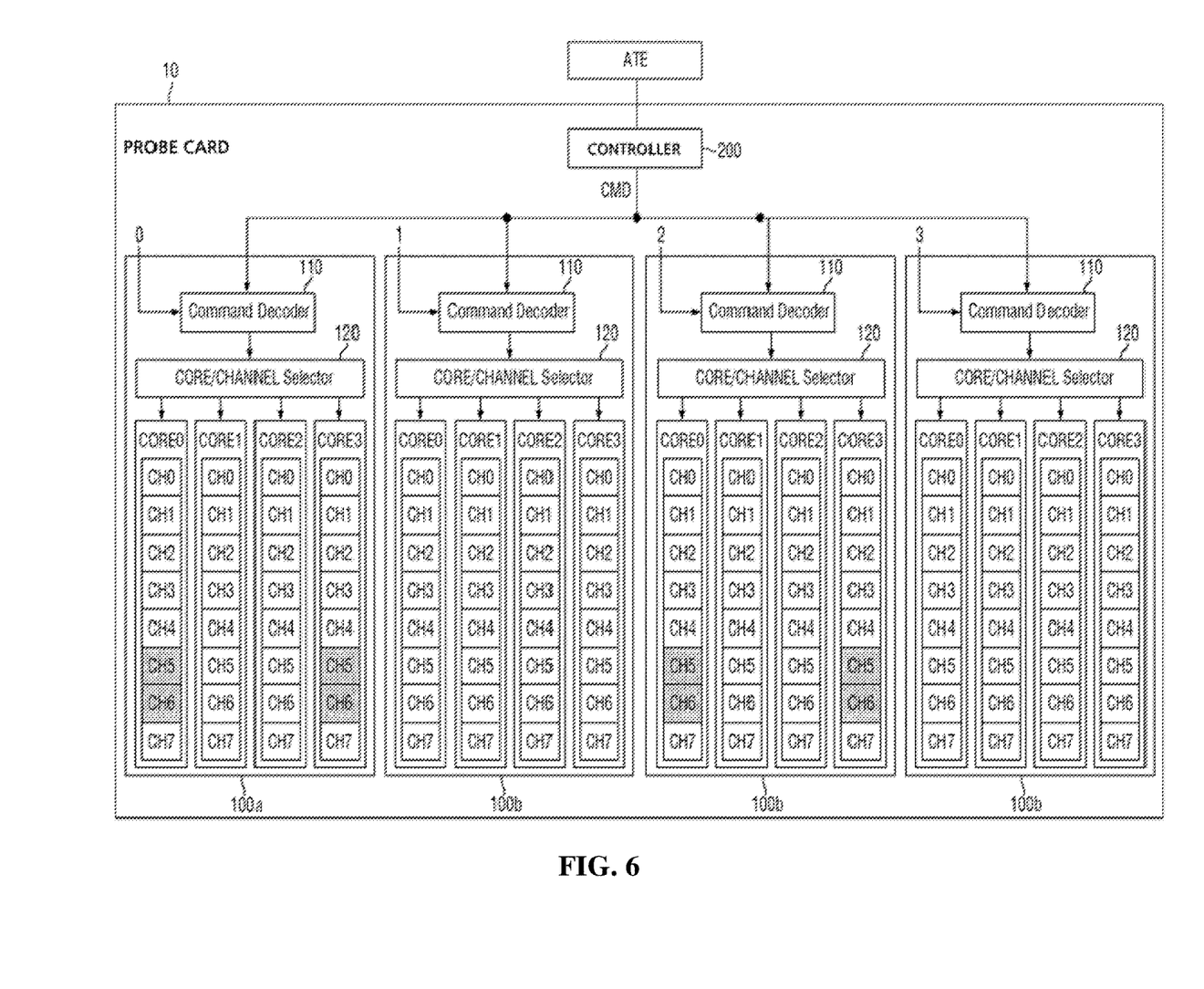
FIG. 6 is a diagram of channels, which are activated by the command (COM), indicated by hatched lines.

FIG. 6 is a diagram of switch ICs, cores, and channels, which are activated by the command (COM), indicated by hatched lines, and Table 1 below is a table that summarizes switch ICs, cores, and channels activated by the embodiment of the command (COM) illustrated in FIG. 5.

TABLE 1

| Switch IC | Core | Channel |
| --- | --- | --- |
| IC_0 | CORE_0 | CH_5 |
| IC_0 | CORE_0 | CH_6 |
| IC_0 | CORE_3 | CH_5 |
| IC_0 | CORE_3 | CH_6 |
| IC_2 | CORE_0 | CH_5 |
| IC_2 | CORE_0 | CH_6 |
| IC_2 | CORE_3 | CH_5 |
| IC_2 | CORE_3 | CH_6 |

Referring to FIG. 6 and Table 1, by the command (COM) of the one frame illustrated in FIG. 5, the fifth channel (CH5) and the sixth channel (CH6) in each of the core 0 (CORE0) and the core 3 (CORE3) of the switch IC (100a) are activated, and the fifth channel (CH5) and the sixth channel (CH6) in each of the core 0 (CORE0) and the core 3 (CORE3) of the switch IC (100c) are activated, so that a total of eight channels is activated. In this embodiment, switch ICs, cores, and channels are hierarchically activated. That is, the switch IC is activated by the switch IC selection data, then the corresponding cores in all switch ICs selected by the core selection data are activated, and the channels in all the cores activated by the channel selection data are activated, so that selection and activation are performed in a hierarchical structure. These structural features provide an advantage of rapid operation when compared to the conventional art.

By designating a channel to be activated in this way, a plurality of target channels may be designated and activated more flexibly when compared to the conventional art in which individual IDs are designated, and the number of times activation commands are transmitted and received is reduced, thereby reducing a channel setup time. As a result, throughput may be improved.

In this embodiment, the command is provided in synchronization with a clock. Thus, high-speed signal transmission is possible, and decoding logic may be simplified to set a state of each channel in a short time. Therefore, high throughput may be achieved during semiconductor manufacture.

Terms or words used in this specification and claims should not be construed as limited to usual or dictionary meanings, and should be interpreted as having meanings and concepts consistent with the technical idea of the present invention based on the principle that an inventor may appropriately define a concept of a term to describe the invention of the inventor in the best way possible.

Therefore, the embodiments described in this specification and the configurations shown in the drawings are only one of the most preferred embodiments of the present invention and do not represent the entire technical idea of the present invention. Thus, it should be understood that, at the time of filing this application, there may be various equivalents and modifications that can replace the embodiments and configurations.

The terms used herein are used to describe specific embodiments and are not intended to limit the invention. As used herein, the singular forms may include the plural forms unless the context clearly indicates otherwise.

The invention claimed is:

1. A switch ID comprising:
   a plurality of cores, each of the cores including a plurality of channels, each of the channels being connected to a device under test (DUT);
   a command decoder configured to receive an identifier (ID) and a command, decode the ID and the command, and form a control signal for control of the cores and the channels; and
   a selector configured to provide a signal for control of activation of the cores and the channels to correspond to the control signal output by the command decoder,
   wherein the command includes switch IC selection data, OP CODE, core selection data, and channel selection data in one frame, and a command encoded to hierarchically control the plurality of cores and the plurality of channels is supported.

2. The switch ID according to claim 1, wherein:
   the switch IC is a signal switch IC connected to a signal processing DUT, or
   the switch IC is one of PMICs connected to a power DUT.

3. The switch ID according to claim 1, wherein the switch IC selection data, the OP CODE, the core selection data, and the channel selection data are transmitted through a data bus through which a plurality of bits is transmitted in parallel.

4. The switch ID according to claim 1, wherein:
   the switch IC selection data is data of at least one bit, and
   the data of the at least one bit of the switch IC selection data corresponds to the switch IC, activation of which is controlled.

5. The switch ID according to claim 4, wherein:
   the core selection data is data of at least one bit, and
   the data of the at least one bit of the core selection data corresponds to the core, activation of which is controlled.

6. The switch ID according to claim 5, wherein:
   the channel selection data is data of at least one bit, and
   the data of the at least one bit of the channel selection data corresponds to the channel, activation of which is controlled.

7. The switch ID according to claim 6, wherein:
   a channel selected by the channel selection data is selected equally for all cores selected by the core selection data, and
   a core selected by the core selection data is selected equally for all switch ICs selected by the switch IC selection data.

8. The switch ID according to claim 1, wherein the switch IC selection data, the OP CODE, the core selection data, and the channel selection data are in succession to form the one frame.

* * * * *